Patented Sept. 22, 1931

1,824,701

UNITED STATES PATENT OFFICE

KARL GUSTAF BERGSTRÖM AND ARTHUR F. ZENNSTRÖM, OF PARIS, FRANCE

TREATMENT OF WOODS FOR CELLULOSE

No Drawing. Application filed February 8, 1930, Serial No. 427,050, and in Finland September 18, 1929.

In the now usual methods of producing cellulose by means of bisulphite one mainly employs only pine (whitewood Picea excelsa) as raw material. Other kinds of woods containing more resin cause troubles, and kinds of woods very rich in resin, such as pinus maritimus, pinus nigra, pinus palustris and many more cannot be treated according to the sulphite process as the strong resin content prevents the acid from entering.

The object of the present invention is to take out the resin by a suitable preliminary treatment of the chips so that the acid can completely enter into the chips, and break it up to cellulose by digesting with simultaneous utilization of the valuable byproducts: turpentine pure, hard resin, lignine, chemically pure carbon and acetic acid, by proceeding in the following manner:

As raw material is used—

I.—Fir, pine or other kinds of wood rich in resin.

II.—Saw-wastes of fir and pine.

III.—Suitable kinds of leafy trees.

IV.—Subwood.

V.—Pine enriched with turpentine, i. e. pine with the same treatment as in the production of peasant-made tar.

VI.—Other kinds of woods and plants rich in resin and balsam.

This raw material is cut into chips and is then treated in an autoclave or digester in the manner described below dependent upon the kind of wood and the local conditions.

Process of treatment A intended for: kinds of woods and plants poor in turpentine, such as fir, leafy trees etcetera for production of cellulose, mechanical pulp and acetic acid.

The chips are treated with weak solution of sodium hydrate or sodium of for instance 1–3° Bé. during a time of for instance 6–24 hours at ordinary temperature, i. e. 15–18° C. A solution of sodium acetate is then obtained. This solution is separated from the chips and cream of lime is added to it, certain impurities being precipitated.

Then the solution is filtered and treated in a known way in order to obtain pure acetate and acetic acid.

The chips are then digested according to known methods, according to sulphite, sulphate or caustic soda methods, to cellulose. Even other plants and kinds of straw may be treated according to this process.

Process of treatment B intended for: kinds of woods and plants rich in turpentine, such as Pichta fir, kinds of pine for production of cellulose, mechanical pulp, acetic acid, so-called French turpentine oil; hard clear resin, lignine and chemically pure carbon.

According to the quality of the wood and the local conditions this treatment is divided into several series of operations.

Series of operation I.—The chips are first treated according to process of treatment A at ordinary room temperature in order to obtain acetic acid, the liquor being then separated and the chips further treated with steam, the turpentine oil being then expelled, condensed and separated in Florentine apparatus. The liquor obtained from the final acetic acid operation, which liquid contains some acids of resin in solution, is enriched with fresh liquor, for instance sodium carbonate or solution of caustic soda, so that it obtains a strength of for instance 2° Bé, the chips being then treated with this liquor at elevated temperatures. At this operation the acids of resin are separated from the chips, the latter being practically freed from resin and fats.

The liquor from this extraction of resin is treated for instance according to the Zennström process, hard clear resin, pure lignine in the form of powder or chemically pure carbon in microscopically fine distribution being then obtained as final products.

Then the chips are treated in a known way according to the sulphite, sulphate or caustic soda methods.

*Series of operation II.*—The chips rich in resin are treated with a solvent of the resin for example, the turpentine oil in a known way. The remaining turpentine oil is expelled from the chips by means of steam. The chips freed from resin are digested to cellulose according to known methods.

*Series of operation III.*—The chips are treated with steam for the purpose of separating the turpentine oil, then a treatment with weak alkali liquor at elevated temperatures follows, and the resin is separated from the liquor by means of known methods.

Hereby French turpentine oil, resin, lignine and chemically pure carbon are obtained. The chips freed from resin are then digested to cellulose according to known processes.

In all the above-mentioned operations the extraction agents should be so weak and the temperature so low, that the natural colour of the wood is changed as little as possible or not at all. The quality of the chemical pulp obtained is the same as the one which is obtained by already known methods, but it holds more alpha cellulose, which considerably increases its value.

The above-mentioned operations may take place in usual autoclaves or special autoclaves with circulation of the extracting agents or also in continuous autoclaves—the Zennström system.

The bark obtained at the decortication of the wood can also be treated according to process A. for the purpose of obtaining acetic acid and tannic acid. The output of acetic acid is in this process almost as large as in dry distillation of wood.

The expenses for treating the chips for the purpose of obtaining turpentine oil, resin and acetic acid form only a small part of their market price.

On treating the chips with weak alkali liquor as well as with turpentine oil one first treats the chips with solutions already employed for one or more extractions and carries out the last extraction with pure solution agent. In this way one obtains concentrated solutions and one is able to extract almost 99.5% of resin from the chips. This resin corresponds to the trade-marks E-F-G-H. The excess of turpentine is, of course, sold, while a certain part circulates in the extraction apparatus.

The lignine is washed with warm water, is dried, pulverised and treated at elevated temperatures with strong mineral acids, the carbon being then separated in microscopically fine distribution. If the carbon is further treated with alkali solution and, after filtration with hydrochloric acid, washed and dried, chemically pure carbon (carbon C) is obtained, which may be used for printing purposes, rubber production, in the electrical industry etcetera.

If the calcium acetate obtained in the production of acetic acid is heated to about 400° C., acetone is obtained according to the following formula:

$$Ca(OCOCH_3)_2 = CO(CH_3)_2 + CaCO_3.$$

The acetic acid is used in the nutriment industry, the dyestuff industry and textile industry, and the artifical silk industry. Acetone is used in the dye-stuff and lacquer industry and especially for the production of smokeless powders. The acetate obtained by the above-mentioned process is so pure that it can be used for the production of acetone whereas hitherto only the more pure acetate from leafy trees has been able to be used for this purpose.

In production of sulphate- and soda-cellulose the chips are treated in the same manner as described above for the purpose of obtaining acetic acid.

What we claim is:

In the fabrication of cellulose from resinous or balsamic woods, in combination a treatment by a weak alkaline solution at room temperature, a treatment by hot turpentine oil and a treatment by steam.

In testimony whereof we have signed our names to this specification.

KARL GUSTAF BERGSTRÖM.
ARTHUR F. ZENNSTRÖM.